United States Patent
Ball et al.

(10) Patent No.: US 8,923,797 B2
(45) Date of Patent: Dec. 30, 2014

(54) METHOD OF ESTABLISHING A COMMUNICATIONS CONNECTION FROM A DEACTIVATED TELEMATICS UNIT ON A MOTOR VEHICLE

(75) Inventors: William L. Ball, Grosse Pointe Farms, MI (US); Steven P. Schwinke, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 1757 days.

(21) Appl. No.: 11/831,320

(22) Filed: Jul. 31, 2007

(65) Prior Publication Data

US 2009/0036091 A1   Feb. 5, 2009

(51) Int. Cl.
*H04M 9/00*   (2006.01)
*H04L 12/701*   (2013.01)
*H04M 3/523*   (2006.01)
*G07C 5/00*   (2006.01)

(52) U.S. Cl.
CPC ............ *H04M 3/5235* (2013.01); *H04L 45/00* (2013.01); *G07C 5/008* (2013.01)
USPC ................... 455/404.1; 455/456.2; 455/406; 455/456.1; 455/419; 455/567; 455/569.2; 455/556.1

(58) Field of Classification Search
USPC ............ 455/569.2, 404.1, 432.1, 415, 456.1, 455/575.9, 419, 404.2, 567, 556.1, 456.2, 455/406, 445
See application file for complete search history.

(56) References Cited

U.S. PATENT DOCUMENTS

| | | | |
|---|---|---|---|
| 5,898,392 A * | 4/1999 | Bambini et al. | 340/996 |
| 6,404,747 B1 * | 6/2002 | Berry et al. | 370/270 |
| 7,012,993 B2 * | 3/2006 | Alton | 379/26.01 |
| 7,218,925 B2 * | 5/2007 | Crocker et al. | 455/419 |
| 7,466,218 B2 * | 12/2008 | Oesterling | 340/426.18 |
| 2003/0109245 A1 * | 6/2003 | McCalmont et al. | 455/404 |
| 2003/0232623 A1 * | 12/2003 | Balasuriya et al. | 455/507 |
| 2004/0203672 A1 * | 10/2004 | Crocker et al. | 455/415 |
| 2005/0107673 A1 * | 5/2005 | Ball | 600/301 |
| 2005/0208936 A1 * | 9/2005 | Sumcad et al. | 455/423 |
| 2005/0246080 A1 * | 11/2005 | Watkins et al. | 701/35 |
| 2006/0003762 A1 * | 1/2006 | Sumcad et al. | 455/428 |
| 2006/0058040 A1 * | 3/2006 | Mazzara et al. | 455/456.3 |
| 2006/0079203 A1 * | 4/2006 | Nicolini | 455/411 |
| 2006/0079219 A1 * | 4/2006 | Nicolini | 455/423 |
| 2007/0003024 A1 * | 1/2007 | Olivier et al. | 379/45 |
| 2007/0135088 A1 * | 6/2007 | Alessandro | 455/404.1 |
| 2008/0120124 A1 * | 5/2008 | Zoeckler et al. | 705/1 |
| 2009/0248236 A1 * | 10/2009 | Schwinke | 701/33 |

* cited by examiner

*Primary Examiner* — Joseph Arevalo
(74) *Attorney, Agent, or Firm* — Anthony Luke Simon; Reising Ethington P.C.

(57) ABSTRACT

A system and method for communicating with a call center from a vehicle telematics unit that has had its cellular service deactivated. The method includes the step of receiving a request from the telematics unit to communicate with the call center via cellular telephony using a cleared telephone number. The call is then established and the type of request is determined at the call center and used to route the cellular call to an appropriate advisor or department in the call center based on the type of request being made.

17 Claims, 3 Drawing Sheets

METHOD OF ESTABLISHING A COMMUNICATIONS CONNECTION FROM A DEACTIVATED TELEMATICS UNIT ON A MOTOR VEHICLE

TECHNICAL FIELD

The invention generally relates to a method for communicating data. More particularly, the invention relates to a communication method that establishes a wireless communication with a telematics-equipped motor vehicle having deactivated cellular service.

BACKGROUND

Numerous types of wireless communication devices are used throughout the world each day, including devices such as cellular phones, pagers, personal digital assistants (PDAs), and vehicle communication devices. Many of these devices use one or more types of communication channels, including voice and data channels, to provide a variety of services over wireless networks. Some devices utilize data encoding techniques to communicate both voice and data information over a voice channel, while other devices must use a data channel to send data information. In certain instances, the use of a dedicated data channel to send and receive data information can result in enhanced data services such as additional bandwidth, error detection, and inter-operability with other devices.

Some motor vehicles come equipped with onboard integrated wireless communication systems that are referred to herein as telematics units. Often times, owners of those motor vehicles choose to deactivate the cellular service associated with the telematics unit. Once the telematics unit is deactivated, normal cellular telephony service is not available to or from the vehicle. However, there are some instances in which it would be desirable to maintain some type of communication with the onboard communication equipment. More specifically, it would be useful even after the telematics unit has been deactivated to provide cellular communication between the motor vehicle and the call center in emergency situations, to enable the owner of the motor vehicle to reactivate the telephony service, and possibly to provide various services to the vehicle or occupants.

SUMMARY OF THE INVENTION

According to an aspect of the invention there is provided a method of a call center communicating with a motor vehicle having a deactivated telematics unit. The method includes the step of receiving at the call center a request for service via a cellular telephone call from the deactivated telematics unit, receiving from the telematics unit data indicative of the request, and automatically identifying a type of request being made based on the data. The type of request can be, for example, a cellular service reactivation request, a crash notification, etc., and can, but need not, be determined automatically based on data received at the call center from the vehicle. In another aspect of the invention, the call can be automatically processed based on the type of request and prior to being answered by an advisor or other service personnel. For example, the call can be automatically handled as an emergency call if it was initiated as the result of a crash sensor, or can be handled as a reactivation request if it was initiated by vehicle operator input into the telematics unit.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The communications method described below attempts to establish a wireless communication between a telematics-equipped motor vehicle and a call center wherein the subscription for cellular service related to the telematics-equipped vehicle is deactivated. Thus, as used herein, a deactivated telematics unit is one for which there is no current cellular subscription service with a cellular telephony provider. Generally, the disclosed method involves use of the telematics unit on the motor vehicle to place a call to a call center using a cellular telephone number that will be recognized by network providers as a cleared telephone number. Once the telephone call is received by the call center, it is routed appropriately, depending on how the call was originated, either manually by the vehicle operator or automatically from sensor activity. This communications method addresses some of the challenges involved in facilitating the communication between a motor vehicle, or its occupant and the call center upon the occurrence of certain events where there telematics unit has previously been deactivated.

Figure 1:
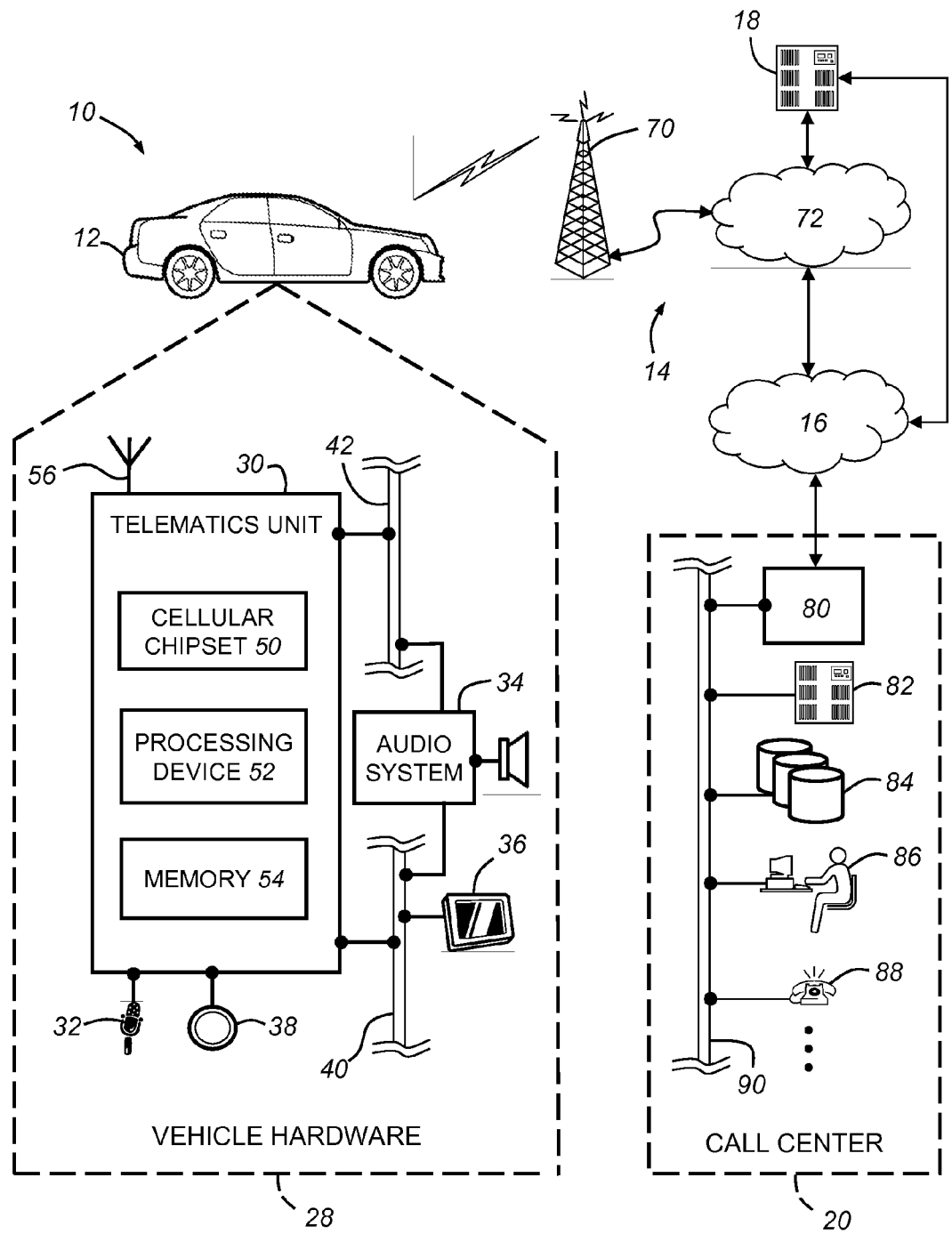
FIG. 1 is a block diagram depicting an exemplary embodiment of a communications system that is capable of utilizing the communications method disclosed herein.

Beginning with FIG. 1, there is shown an exemplary operating environment that can be used to implement the communications method disclosed herein. Communications system 10 generally includes a vehicle 12, a wireless carrier system 14, a communications network 16, a network address server 18, and a call center 20. It should be understood that the communications method can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle hardware 28 is shown generally in FIG. 1 and includes a telematics unit 30, a microphone 32, an audio system 34, a visual display 36, and an electronic button or control 38 that are interconnected using one or more network connections, such as a communications bus 40 or an entertainment bus 42. Examples of suitable network connections include a controller area network (CAN), a media oriented system transfer (MOST), a local interconnection network (LIN), an ethernet, a local area network (LAN), and other appropriate connections such as those that conform with known ISO, SAE and IEEE standards and specifications, to name but a few.

Telematics unit 30 preferably enables wireless voice and/or data communication over wireless carrier system 14 so that the vehicle can communicate with call center 20, other telematics-enabled vehicles, or some other entity. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. According to one embodiment, telematics unit 30 includes a standard cellular chipset 50 for voice communications like hands-free calling, a modem (not shown) for data transmission, an electronic processing device 52, one or more electronic memory devices 54, and a dual antenna 56. It should be appreciated that the modem can either be implemented through software that is stored in the telematics unit and is processed by electronic processing device 52, or it can be a separate hardware component located internal or external to telematics unit 30. The modem can operate using any number of different standards or protocols such as EVDO, CDMA 1XRTT, GPRS, EDGE, WiMAX and HSDPA, to name but a few.

Electronic processing device 52 can be any type of suitable processing device capable of processing electronic instructions including, but certainly not limited to, microprocessors, microcontrollers, host processors, controllers, vehicle communication processors, and application specific integrated circuits (ASICs). Alternatively, the electronic processing device can work in conjunction with some type of central processing unit (CPU) or other component performing the function of a general purpose processor. Electronic processing device 52 executes various types of electronic instructions, such as software or firmware programs stored in electronic memory 54, which enable the telematics unit to provide a wide variety of services. For instance, electronic processing device 52 can execute programs or process data that enables the communications method discussed herein.

Telematics unit 30 provides too many services to list them all, but several examples include: turn-by-turn directions and other navigation-related services that are provided in conjunction with a GPS-based vehicle navigation module (not shown); airbag deployment notification and other emergency or roadside assistance-related services that are provided in connection with one or more collision sensor interface modules such as a body control module (not shown); and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an illustration of some of the services that the telematics unit is capable of offering. Furthermore, it should be understood that the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are located external to telematics unit 30, they could utilize vehicle bus 40 and/or entertainment bus 42 for communication therebetween. It is anticipated that one or more of the modules that interact with telematics unit 30 will utilize sensors, like gyroscopes, accelerometers, magnetometers, and emission detection sensors, for reporting different operational, environmental, or other conditions surrounding the vehicle.

Vehicle hardware 28 also includes a number of vehicle user interfaces that provide vehicle occupants with a means of providing and/or receiving information, including microphone 32, audio system 34, visual display 36, and button 38. These devices allow a vehicle user to input commands, receive audio/visual feedback, and provide voice communications, to name but some of the possibilities. Microphone 32 provides an occupant with a means for inputting verbal or other auditory information, and can be connected to an automated voice processing unit utilizing human-machine interface (HMI) technology known in the art. Conversely, audio system 34 provides verbal output to a vehicle occupant and can be a dedicated, stand-alone system or part of the primary vehicle audio system. According to the particular embodiment shown here, audio system 34 is operatively coupled to both vehicle bus 40 and entertainment bus 42 and can provide AM, FM and satellite radio, CD, DVD and other multimedia functionality. This functionality can be provided in conjunction with or independent of the infotainment module described above. Visual display 36 is preferably a graphics display, such as a touch screen on the instrument panel or a heads-up display reflected off of the windshield, and can be used to provide a multitude of input and output functions. Button 38 is an electronic pushbutton or other control that is typically used to initiate communication with call center 20 or some other service. Of course, numerous other vehicle user interfaces can also be utilized, as the aforementioned interfaces are only examples of some of the possibilities.

Wireless carrier system 14 is preferably a cellular telephone system, but could be any other suitable wireless system, such as a satellite-based system capable of transmitting signals between vehicle hardware 28 and call center 20. According to an exemplary embodiment, wireless carrier system 14 includes one or more cell towers 70, base stations and/or mobile switching centers (MSCs) 72, as well as any other networking components required to connect wireless carrier system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Wireless carrier system 14 may utilize various networking devices or components like routers, servers, switches, etc. to facilitate data channel communications and/or provide additional services and features. For example, wireless carrier system 14 may utilize any number of networking components to provide one or more of the following services: authentication, dynamic host configuration protocol (DHCP), network address assignment, domain name system (DNS), dynamic DNS (DDNS), mobile number to network address resolution, SO33 paging, and other network services. It will be appreciated by those skilled in the art that such services may be performed by any number of devices or components located within wireless carrier system 14, land network 16, call center 20, or simply in communication with wireless carrier system 14.

In one embodiment, wireless carrier system 14 may use authentication services to verify that each telematics-equipped vehicle that requests a data channel connection is authorized to do so. Authorization may be accomplished in a number of ways including, for example, using the mobile number of the telematics-equipped vehicle to verify that the vehicle is authorized to use a data channel. Wireless carrier system 14 may then provide the telematics-equipped vehicle 12 with a dynamic network address using dynamic host configuration protocol (DHCP), or any other suitable method of allocating dynamic network addresses to telematics-equipped vehicles.

Land network 16 may be a conventional land-based telecommunications network that is connected to one or more landline telephones and connects wireless carrier system 14 to call center 20. For example, land network 16 may include a public switched telephone network (PSTN) and/or a TCP/IP network, as is appreciated by those skilled in the art. Of course, one or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Network address server 18 preferably receives, stores, manages, searches and/or provides information that correlates network addresses with specific vehicle identifiers. Network address server 18 can be implemented according to one of a number of different software and/or hardware arrangements known in the art. For instance, network address server 18 can include a dedicated computer or a shared component of a separate computing system, to name but a few possibilities. Furthermore, it is possible for network address server 18 to be housed at wireless carrier network 14, land network 16, call center 20, a dedicated location (as shown), or any other appropriate computing facility. Generally, network address server 18 is in communication with wireless carrier system 14 and land network 16, although such communication may be indirect and facilitated by intermediary devices like a firewall and/or a proxy server. In one embodiment, network address server 18 is a standalone networked server computer, such as a DNS server, that manages a database populated with information received from wireless carrier system 14. The DNS server can store information like vehicle identifier/network address pairings in a database; manage the stored data by adding, deleting, or updating records; search the stored data upon request; and provide search result information, for example.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder, as previously explained, and can be connected to various devices such as a server 82 and database 84. Database 84 could be designed to store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Communications Method—

Figure 2:
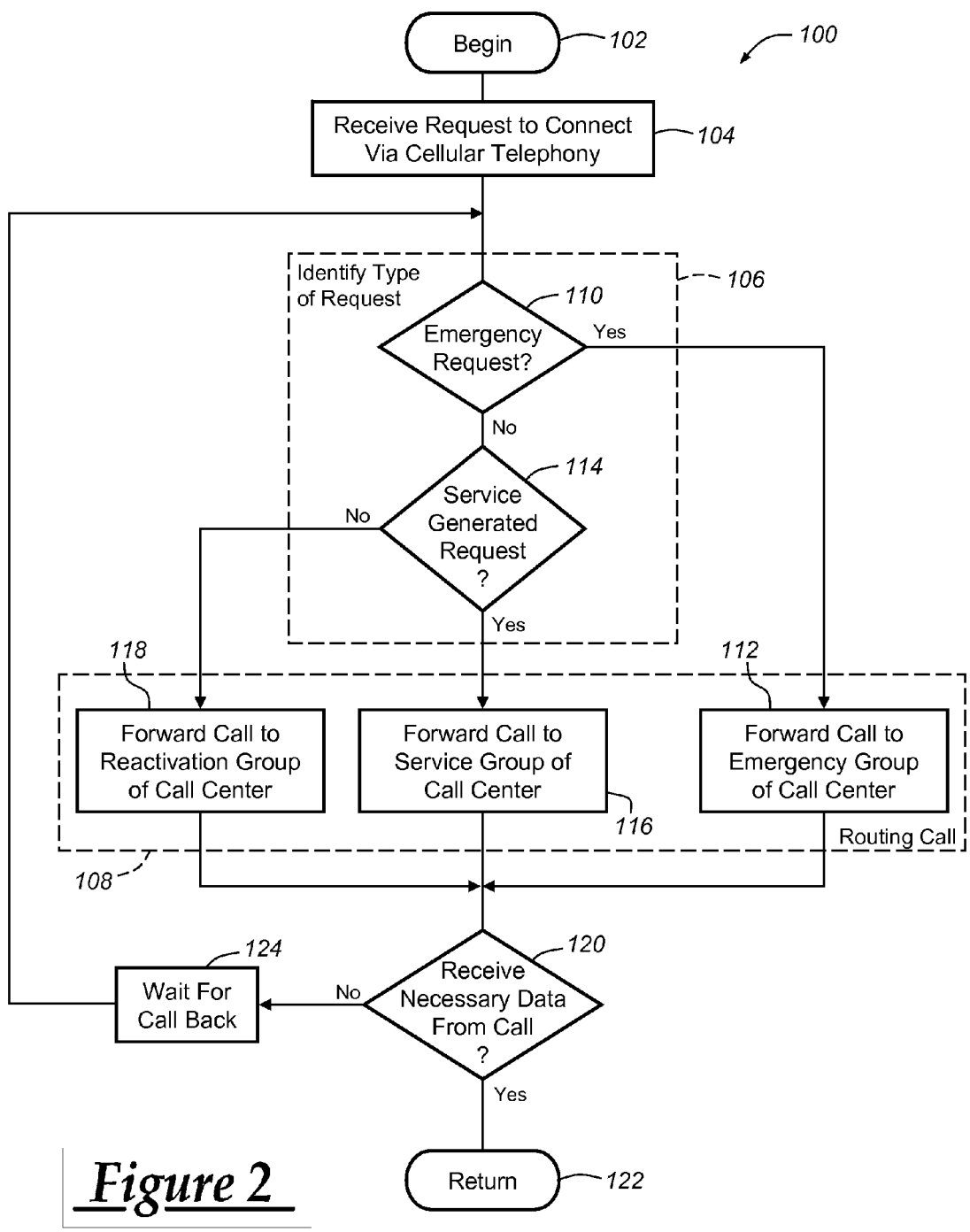
FIG. 2 is a flow chart depicting steps of an embodiment of the communications method.

The communications method of the preferred embodiment can be used to establish cellular communications from motor vehicle 12 in instances where its telematics unit 30 has been deactivated. Referring to FIG. 2, a portion of the disclosed method is generally indicated at 100. The method begins at 102. The call center 20 receives a telephone call from the vehicle's deactivated telematics unit 30 at 104. This telephone call can be carried out using a cleared number as described below in conjunction with FIG. 3. The call is initiated by a request at the vehicle to connect the telematics unit 30 to the call center 20 to allow data, voice or digital, to be bidirectionally transmitted. The request to connect causes the telematics unit to contact and pass the request onto the call center, which then identifies the type of request being made at 106. Once the type of request is identified, discussed in greater detail subsequently, the cellular call is routed at 108 to a proper group within the call center 20 to properly handle the cellular call.

Returning our attention to the step of identifying the type of request 106, the telematics unit 30 sends to the call center 20 data indicating the type of request. This can be for emergency services as the result of, for example, an air bag deployment (or other type of crash notification) or a call from an occupant for emergency assistance using a voice command input to the telematics unit. As another example, it could be the result of a manual (e.g., pushbutton switch) input by the occupant who is seeking to request reactivation of cellular service. It could also be an automatic or operator-initiated request for some other type of vehicle service; for example, to activate satellite radio service. Thus, in the exemplary method 100 of FIG. 2, using the data initially received from the telematics unit 30, the call center first determines whether the cellular call has been generated through an emergency request at 110. If so, the call is immediately forwarded to the emergency group of the call center 20 at 112. If not, the method then determines whether the cellular call has been generated by a service request at 114. If the cellular call was generated by a service request, the call is forwarded to a service group of the call center at 116.

And finally, if the cellular call was not generated by the automated crash notification system or a service request, the call is then forwarded to a reactivation group of the call center 20 at 118. The reactivation group will discuss with the user of the telematics unit 30 about whether the cellular services should be reactivated on the motor vehicle 12.

Once the cellular call has been routed, the method 100 continues to receive data from the call at 120. If there is enough communication that the call center 20 can establish that sufficient information has been transmitted between the call center 20 and the motor vehicle 12, the cellular call is allowed to terminate on its own at 122. If, however, it is determined that insufficient data or communications were transmitted between the telematics unit 30 and the call center 20, a code would not be transmitted to the telematics unit 30 identifying that the communication has been terminated. In that situation, the call center 20 waits for the telematics unit 30 to call back at 124. Once the telematics unit call back, due to the fact that it did not receive a termination code from the call center 20, the call center then loops the method 100 back to a place where it needs to identify the type of request 106 being made by the call back from the telematics unit 30. This helps insure a completed communication with the call center in the event that the call is prematurely interrupted, since the call center is not able to call back to the deactivated telematics unit.

Figure 3:
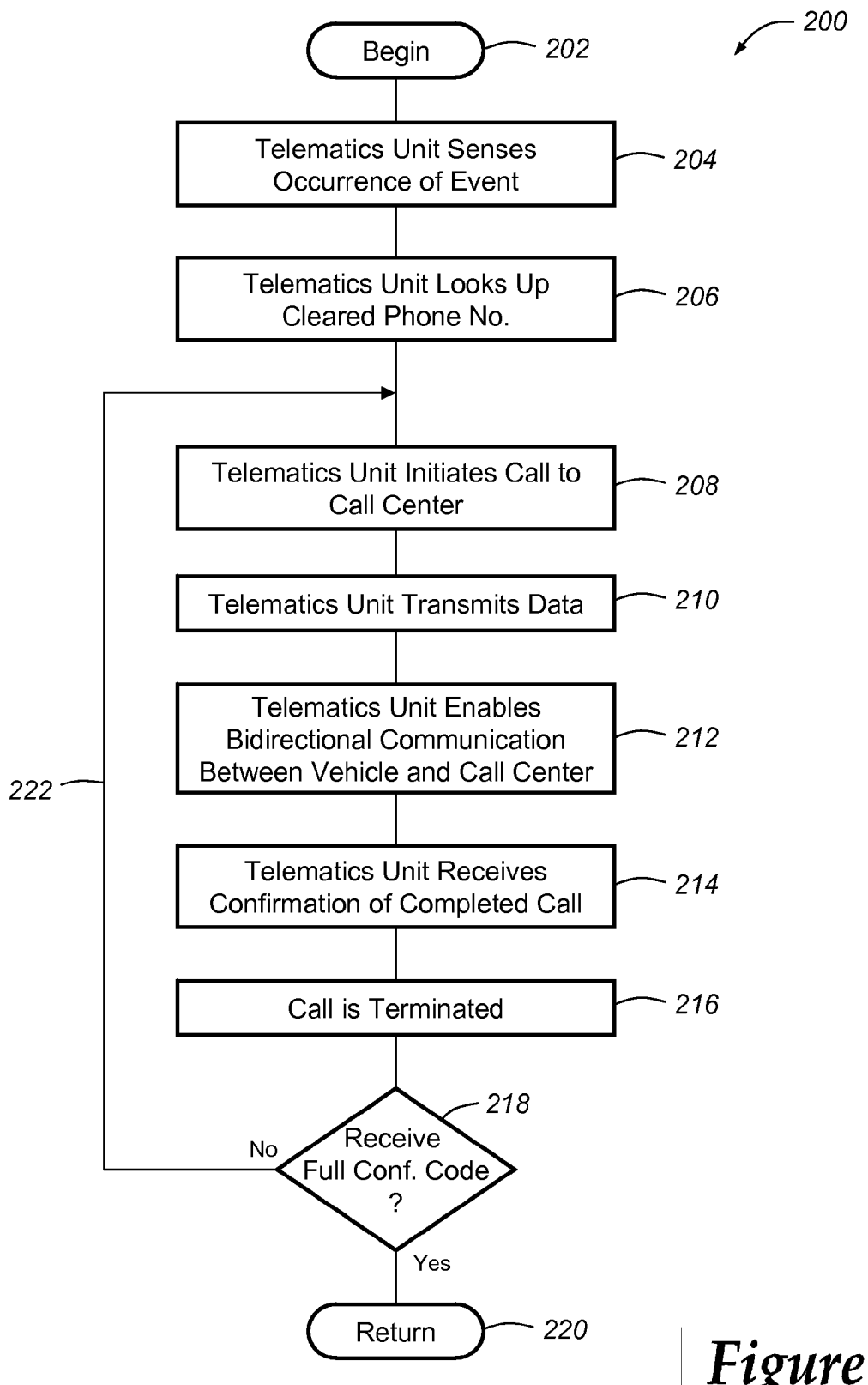
FIG. 3 is also a flow chart depicting steps of an embodiment of the communications method.

Referring to FIG. 3, a process for carrying out the call from the deactivated telematics unit 30 is shown at 200. This portion of the method relates to the activation of and communication from the telematics unit 30 due to the occurrence of an event. The method 200 begins at 202. The telematics unit 30 senses the occurrence of an event at 204. The telematics unit 30 then looks up a cleared telephone number at 206. The cleared telephone number is a number that is prepaid by the entity affiliated with the calling center 20 to receive calls regardless of whether the originating telematics unit 30 has a subscription for the cellular service or not. One or more such cleared numbers can be stored in the telematics unit when the vehicle is first manufactured and/or can be added or updated prior to deactivation of the telematics unit.

The telematics unit 30 then initiates a call to the call center 20 at 208 using the cleared telephone number. As soon as the cellular provider identifies the attempt to place a call is through the use of a cleared telephone number, it connects the call without determining whether the telematics unit 30 has a current subscription. Once connected, the telematics unit 30 then transmits data (at 210) to the call center 20. Once the initial data has been transmitted and received, it can be used to automatically determine how the call should be handled (e.g., emergency call versus a request for reactivation) using the process of FIG. 2, and the call can be routed to a call center advisor for which bidirectional data and/or voice communication is enabled between the vehicle 12 and the call center 20. This is shown at step 212. Upon notification that the cellular call is a completed cellular call for purposes of the call center obtaining all of the necessary information, the telematics unit 30 receives confirmation of a completed call at 214. Once the completed confirmation is received, the call may be terminated at 216. It should be apparent to those skilled the in art that the voice portion of the cellular call may continue long after the type of request and any other needed data has been passed to the call center. Once all data has been transmitted, the method 200 then determines whether it received a full confirmation code at 218. If so the method is terminated at 220. If the call ends before the telematics unit receives confirmation that the call can be terminated, then the method loops back via loop 222 to step 208 where the telematics unit 30 initiates another call to the call center 20.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for a call center to communicate with a motor vehicle having a deactivated telematics unit, the method comprising the steps of:
    receiving at the call center a request for service via a cellular telephone call from the deactivated telematics unit;
    receiving from the telematics unit data indicative of the request along with the cellular telephone call;
    automatically identifying at the call center a type of request being made based on the data; and
    routing the cellular telephone call to a non-emergency group within the call center when the type of request identified from the data is determined to be non-emergency and to an emergency group within the call center when the type of request is determined to be an emergency.

2. A method as set forth in claim 1, wherein the step of identifying the type of request includes the step of detecting a source for originating the cellular call.

3. A method as set forth in claim 1, wherein the step of routing the cellular call includes the step of forwarding the cellular call to an emergency portion of the call center when the cellular call was initiated automatically.

4. A method as set forth in claim 3, wherein the step of routing the cellular call includes the step of routing the cellular call to a reacquisition portion of the call center when the cellular call is initiated manually.

5. A method as set forth in claim 1, including the step of accepting a subsequent call when the cellular call is dropped before data can be fully transmitted to the call center.

6. A method as set forth in claim 5 including the step of terminating the cellular call upon completion of data transfer.

7. A method as set forth in claim 6 including the step of terminating the subsequent call upon completion of data transfer.

8. A method for a motor vehicle, having a telematics unit, to initiate communication with a call center upon an occurrence of an event after cellular telephony of the telematics unit has been deactivated, the method comprising the steps of:
    sensing the occurrence of the event;
    initiating a cellular call to the call center using a cleared cellular number;
    transmitting data including a type of request to the call center;
    communicating with a particular group within the call center based on the type of request; and
    terminating the cellular call after completion of the transfer of data.

9. A method as set forth in claim 8 including the step of initiating a subsequent call to the call center when the cellular call is terminated before all data is transferred.

10. A method as set forth in claim 9 wherein the step of sensing the occurrence of an event includes the step of receiving signals from accident notification sensors.

11. A method as set forth in claim 10 wherein the step of sensing the occurrence of an event includes the step of receiving signals from sensors designed to measure parameters of the motor vehicle.

12. A method as set forth in claim 11 wherein the step of sensing the occurrence of an event includes the step of sensing a switch changing state.

13. A method as set forth in claim 12 wherein the step of sensing the switch changing state includes a manual operation of the switch by a passenger of the motor vehicle.

14. A method for a call center to communicate with a motor vehicle having a deactivated telematics unit, the method comprising the steps of:
   (a) receiving a cellular call at a call center from a vehicle telematics unit that has previously been deactivated;
   (b) determining whether the cellular call has been generated at the vehicle through an emergency request;
      (b1) if so, forwarding the cellular call to an emergency group of the call center;
   (c) otherwise, determining if the cellular call was generated by a service request; and
      (c1) if not, forwarding the cellular call to a reactivation group of the call center; and
   (d) instructing the vehicle telematics unit to place a subsequent cellular call to the call center using a cleared number if the vehicle telematics unit does not receive a code that is transmitted to the vehicle telematics unit at the end of the cellular call.

15. The method of claim 14, further comprising the steps of determining that the cellular call was generated by the service request; and forwarding the call to a service group of the call center.

16. The method of claim 14, further comprising the step of wirelessly transmitting a code to the vehicle telematics unit alerting the vehicle telematics unit that the cellular call has been terminated.

17. The method of claim 14, further comprising the step of receiving the cellular call at the call center via a cleared number.

* * * * *